United States Patent
Tojino

(10) Patent No.: US 12,351,663 B2
(45) Date of Patent: Jul. 8, 2025

(54) DISPERSION LIQUID, INK COMPOSITION FOR INK JET RECORDING, AND DISPERSION RESIN

(71) Applicant: Seiko Epson Corporation, Tokyo (JP)

(72) Inventor: Mami Tojino, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 859 days.

(21) Appl. No.: 17/534,515

(22) Filed: Nov. 24, 2021

(65) Prior Publication Data

US 2022/0162367 A1    May 26, 2022

(30) Foreign Application Priority Data

Nov. 25, 2020    (JP) ................. 2020-195214

(51) Int. Cl.
| | |
|---|---|
| C08F 222/04 | (2006.01) |
| C08F 212/08 | (2006.01) |
| C08F 222/06 | (2006.01) |
| C08F 228/00 | (2006.01) |
| C08F 228/02 | (2006.01) |
| C08F 277/00 | (2006.01) |
| C08J 3/05 | (2006.01) |
| C08K 5/357 | (2006.01) |
| C09D 11/106 | (2014.01) |
| C09D 11/30 | (2014.01) |
| C09D 11/326 | (2014.01) |
| C09D 11/328 | (2014.01) |
| C09D 11/38 | (2014.01) |

(52) U.S. Cl.
CPC .......... *C08F 222/04* (2013.01); *C08F 212/08* (2013.01); *C08F 222/06* (2013.01); *C08F 228/00* (2013.01); *C08F 228/02* (2013.01); *C08F 277/00* (2013.01); *C08J 3/05* (2013.01); *C08K 5/357* (2013.01); *C09D 11/106* (2013.01); *C09D 11/30* (2013.01); *C09D 11/326* (2013.01); *C09D 11/328* (2013.01); *C09D 11/38* (2013.01); *C08J 2351/00* (2013.01)

(58) Field of Classification Search
CPC .... C08F 222/04; C08F 222/06; C08F 212/08; C08F 228/00; C08F 228/02; C09D 11/30–328
See application file for complete search history.

(56) References Cited

U.S. PATENT DOCUMENTS

| | | | | |
|---|---|---|---|---|
| 2,985,625 | A | * 5/1961 | Jones | ..................... C09K 23/22 526/263 |
| 9,416,280 | B2 | * 8/2016 | Richards | .............. C09D 11/101 |
| 10,717,292 | B2 | 7/2020 | Sato et al. | |
| 2009/0285989 | A1 | 11/2009 | Lozman et al. | |

FOREIGN PATENT DOCUMENTS

| | | | | |
|---|---|---|---|---|
| DE | 4034871 A | * | 5/1992 | ............. C08L 89/06 |
| EP | 0735120 A2 | | 10/1996 | |
| GB | 1357522 A | * | 6/1974 | ............... C08F 8/00 |
| JP | H08-269379 A | | 10/1996 | |
| JP | 2000-239979 A | | 9/2000 | |
| JP | 2008-536963 A | | 9/2008 | |
| JP | 2015-048437 A | | 3/2015 | |
| JP | 2016-190937 A | | 11/2016 | |
| JP | 2017-075302 A | | 4/2017 | |
| JP | 2020-180210 A | | 11/2020 | |
| WO | 2006/099551 A2 | | 9/2006 | |

OTHER PUBLICATIONS

George Odian, Principles of Polymerization, Fourth edition, Radical Chain Polymerization, pp. 289-292 (Year: 2004).*

* cited by examiner

*Primary Examiner* — Marc S Zimmer
*Assistant Examiner* — Surbhi M Du
(74) *Attorney, Agent, or Firm* — Harness, Dickey & Pierce, P.L.C.

(57) ABSTRACT

A dispersion liquid includes water, a coloring material, and a dispersion resin that disperses the coloring material. The dispersion resin has a constituent unit A containing a hydrophobic monomer, and a predetermined constituent unit B.

10 Claims, No Drawings

DISPERSION LIQUID, INK COMPOSITION FOR INK JET RECORDING, AND DISPERSION RESIN

The present application is based on, and claims priority from JP Application Serial Number 2020-195214, filed Nov. 25, 2020, the disclosure of which is hereby incorporated by reference herein in its entirety.

BACKGROUND

1. Technical Field

The present disclosure relates to a dispersion liquid, an ink composition for ink jet recording, and a dispersion resin.

2. Related Art

An ink jet recording method can record high-definition images by a relatively simple apparatus and is rapidly developed in various fields. In particular, various investigations are performed on the color development of coloring materials in inks. For example, JP-A-2016-190937 discloses that a predetermined dye is used for the purpose of providing an ink set having excellent color development of composite black.

One of the conceivable methods for improving dispersibility of a coloring material is to use a dispersant. For example, JP-A-2016-190937 discloses that a (α-methyl) styrene-maleic acid (anhydride) copolymer or an acrylate ester-maleic acid (anhydride) copolymer is used as a dispersant.

However, an ink composition containing a usual dispersant, such as an (α-methyl)styrene-maleic acid (anhydride) copolymer, described in JP-A-2016-190937 has a problem that when a coloring material is solidified by drying of an ink, subsequent re-dispersion becomes difficult, and thus a defect easily occurs when the ink is re-ejected after drying.

SUMMARY

According to an aspect of the present disclosure, a dispersion liquid includes water, a coloring material, and a dispersion resin that disperses the coloring material. The dispersion resin has a constituent unit A containing a hydrophobic monomer and a constituent unit B represented by any one of the following formulae (1-1) and (1-2).

(1-1)

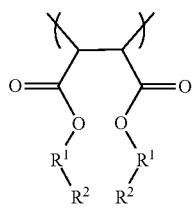

(1-2)

In the formulae, $R^1$ independently represents a divalent organic group having 1 to 20 carbon atoms, and $R^2$ independently represents a sulfonate group or a salt thereof.

According to another aspect of the present disclosure, an ink composition for ink jet recording includes the dispersion liquid, a surfactant, and a water-soluble organic solvent.

According to a further aspect of the present disclosure, a dispersion resin has a constituent unit A containing a hydrophobic monomer and a constituent unit B represented by any one of the formulae (1-1) and (1-2) described above.

DESCRIPTION OF EXEMPLARY EMBODIMENTS

An embodiment of the present disclosure (referred to as a "present embodiment" hereinafter) is described in detail below, but the present disclosure is not limited to this, and various modifications can be made within a range not deviating from the gist of the present disclosure.

1. Dispersion Liquid

A dispersion liquid according to the present embodiment includes water, a coloring material, and a dispersion resin that disperses the coloring material. The dispersion resin has a constituent unit A containing a hydrophobic monomer and a constituent unit B represented by any one of the following formulae (1-1) and (1-2).

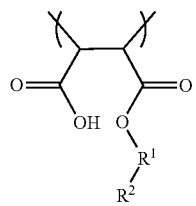

(1-1)

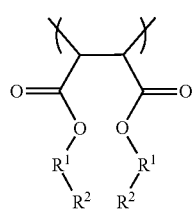

(1-2)

In the formulae, $R^1$ independently represents a divalent organic group having 1 to 20 carbon atoms, and $R^2$ independently represents a sulfonate group or a salt thereof.

A dispersion liquid or ink composition using a usual dispersion resin has a problem that once a coloring material is solidified, re-dispersion is difficult. On the other hand, according to the present embodiment, the use of the dispersion resin having the configuration described above enables easy re-dispersion of the solidified coloring material and also enables more improvement in re-ejection property (dry ejection characteristics) when an ink in a nozzle is dried. Each of the components is described in detail below, 1. 1. Dispersion Resin The dispersion resin has the constituent unit A containing a hydrophobic monomer and the constituent unit B represented by any one of the formulae (1-1) and (1-2), and if required, it may have a constituent unit C described later. In the present embodiment, the "constituent unit" represents a repeating unit which constitutes a portion of the dispersion resin after polymerization, and the "monomer" represents a monomer having a polymerizable unsaturated bond before polymerization.

The dispersion resin may be a random copolymer, a block copolymer, or a graft copolymer. Examples of the block copolymer include a diblock copolymer having a block A composed of a constituent unit A and a block B composed of a constituent unit B; a diblock copolymer having a block A composed of a constituent unit A and a random block B/C composed of a constituent unit B and a constituent unit C; and the like. The use of such a dispersion resin tends to more improve re-dispersibility after solidification and to more improve ejection stability and dry ejection characteristics.

The content of the dispersion resin relative to the total amount of the dispersion liquid is preferably 0.3% to 10% by mass, more preferably 0.5% to 5.0% by mass, and still more preferably 1.0% to 3.0% by mass. When the content of the dispersion resin is within the range described above, there is a tendency to more improve re-dispersibility after solidification and to more improve ejection stability and dry ejection characteristics.

The content of the dispersion resin relative to 100 parts by mass of the coloring material is preferably 10 to 100 parts by mass, more preferably 20 to 80 parts by mass, and still more preferably 30 to 60 parts by mass. When the content of the dispersion resin is within the range described above, there is a tendency to more improve re-dispersibility after solidification and to more improve ejection stability and dry ejection characteristics.

1. 1. 1. Constituent Unit A

The constituent unit A is a constituent unit containing a hydrophobic monomer and partially imparts hydrophobicity to the dispersion resin. Although not particularly limited, the constituent unit A is aligned on the surface of the coloring material due to hydrophobic interaction and thus can contribute to adsorption of the dispersion resin to the coloring material.

Examples of the hydrophobic monomer constituting the constituent unit A include, but are not particularly limited to, vinyl monomers having an aromatic group, such as styrene, α-methylstyrene, allylbenzene, vinyltoluene, 1-vinylnaphthalene, 2-vinylnaphthalene, and the like; and acrylate ester monomers having a hydrocarbon group, such as methyl (meth)acrylate, ethyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, 2-ethylhexyl (meth)acrylate, benzyl (meth)acrylate, and the like. In the present embodiment, "(meth)acrylate" includes "acrylate" and "methacrylate". The monomers may be used alone or in combination of two or more as the monomer constituting the constituent unit A.

Among these, vinyl monomers having an aromatic group are preferred, and one or more selected from the group consisting of styrene, α-methylstyrene, allylbenzene, vinyltoluene, 1-vinylnaphthalene, and 2-vinylnaphthalene are more preferred. The use of such a hydrophobic monomer tends to more improve the adsorptivity of the dispersion resin to the coloring material, to more improve re-dispersibility after solidification, and to more improve ejection stability and dry ejection characteristics.

The content of the constituent unit A relative to the total amount of the dispersion resin is preferably 40 to 85 mol %, more preferably 45 to 80 mol %, and still more preferably 50 to 75 mol %. When the content of the constituent unit A is within the range described above, there is a tendency to more improve re-dispersibility after solidification and to more improve ejection stability and dry ejection characteristics.

1. 1. 2. Constituent Unit B

The constituent unit B is a constituent unit represented by any one of the formulae (1-1) and (1-2) below and partially imparts hydrophobicity to the dispersion resin. Although not particularly limited, the constituent unit B is aligned on the side opposite to the surface of the coloring material and thus can contribute to improvement in dispersibility. The monomers may be used alone or in combination of two or more as the monomer constituting the constituent unit B.

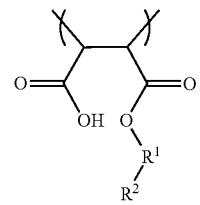

(1-1)

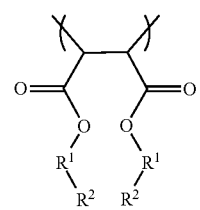

(1-2)

In the formulae, $R^1$ independently represents a divalent organic group having 1 to 20 carbon atoms, and $R^2$ independently represents a sulfonate group or a salt thereof.

Examples of the divalent organic group having 1 to 20 carbon atoms represented by $R^1$ include, but are not particularly limited to, divalent aliphatic hydrocarbon groups (an alkylene group, a cycloalkylene group, an alkylene-cycloalkylene group, and the like), divalent aromatic hydrocarbon groups (an arylene group, an alkylene-arylene group, and the like), and the like.

Among these, the divalent organic group represented by $R^1$ preferably contains one or more selected from the group consisting of a divalent aliphatic hydrocarbon group and a divalent aromatic hydrocarbon group, and an alkylene group or an arylene group is more preferred. This tends to more improve re-dispersibility after solidification and to more improve ejection stability and dry ejection characteristics.

Examples of the alkylene group include, but are not particularly limited to, a methylene group, an ethylene group, a propylene group, an isopropylene group, a butylene group, a 1,2-dimethylethylene group, a pentylene group, a 1-methylbutylene group, a 2-methylbutylene group, a heptylene group, an octylene group, a nonylene group, and a decylene group.

Examples of the cycloalkylene group include, but are not particularly limited to, a cyclopropylene group, a cyclobutylene group, a cyclopentylene group, a cyclohexylene group, a cyclooctylene group, a cyclodecylene group, a cyclododecylene group, a cyclohexadecylene group, and a cyclooctadecylene group.

The alkylene-cycloalkylene group is, for example, a group formed by a combination of the alkylene group and the cycloalkylene group.

Examples of the arylene group include, but are not particularly limited to, a phenylene group, a naphthylene group, a methylphenylene group, an ethylphenylene group, a methylnaphthylene group, and a dimethylnaphthylene group.

Examples of the alkylene-arylene group include, but are not particularly limited to, groups each formed by a combination of the alkylene group and the arylene group.

The number of carbon atoms of the divalent organic group represented by $R^1$ is 1 to 20, preferably 1 to 12, and more preferably 1 to 8.

Examples of a salt of the sulfonate group represented by $R^2$ include, but are not particularly limited to, a sodium salt, a lithium salt, a potassium salt, an ammonium salt, and the like.

The constituent unit B may be a constituent unit formed by introducing a compound having a sulfonate group and a hydroxyl group into a constituent unit containing maleic anhydride. The use of such a constituent unit B tends to more improve re-dispersibility after solidification and to more improve ejection stability and dry ejection characteristics. When one of the carboxylic acids of maleic anhydride is esterified, esterification of the other carboxylic acid tends to hardly take place even if the compound is relatively excessively present.

Examples of the compound having a sulfinate group and a hydroxyl group include, but are not particularly limited to, compounds represented by a formula (1-3) below. In the formula (1-2), $R^1$ and $R^2$ each represent the same group as described above in the formulae (1-1) and (1-2). Among these, the compound having a sulfonate group and a hydroxyl group is not particularly limited, but is preferably, for example, isethionic acid or p-toluenesulfonic acid.

$$R^2-R^1-OH \quad (1-3)$$

In the formula, $R^1$ independently represents a divalent organic group having 1 to 20 carbon atoms, and $R^2$ independently represents a sulfonate group or a salt thereof.

The content of the constituent unit B relative to the total amount of the dispersion resin is preferably 15 to 60 mol %, more preferably 20 to 55 mol %, and still more preferably 22 to 50 mol %. When the content of the constituent unit B is within the range described above, there is a tendency to more improve re-dispersibility after solidification and to more improve ejection stability and dry ejection characteristics.

1. 1. 3. Constituent Unit C

The dispersion resin may further have a constituent unit C represented by a formula (2-1) below. Having such a constituent unit C tends to more improve re-dispersibility after solidification and to more improve ejection stability and dry ejection characteristics.

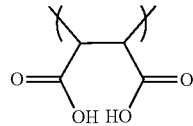

(2)

The constituent unit C may be a constituent unit containing maleic anhydride in which an acid anhydride group is hydrolyzed.

The content of the constituent unit C relative to the total amount of the dispersion resin is preferably 0.5 to 15 mol %, more preferably 0.5 to 10 mol %, and still more preferably 1.0 to 5.0 mol %. When the content of the constituent unit C is within the range described above, there is a tendency to more improve re-dispersibility after solidification and to more improve ejection stability and dry ejection characteristics.

1. 1. 4. Weight-Average Molecular Weight

The weight-average molecular weight of the dispersion resin is 5,000 to 30,000, preferably 5,000 to 20,000, and more preferably 5,000 to 15,000. When the weight-average molecular weight of the dispersion resin is within the range described above, there is a tendency to more improve re-dispersibility after solidification and to more improve ejection stability and dry ejection characteristics.

The weight-average molecular weight can be measured by a known method using chromatography, and more specifically can be measured by a method described in examples.

1. 1. 5. Production Method

The dispersion resin according to the present embodiment can be produced by copolymerizing monomers constituting the respective constituent units. The polymerization reaction is not particularly limited, but for example, radial polymerization, particularly living radical polymerization, can be used. In addition, a constituent unit containing maleic anhydride of a styrene-maleic anhydride copolymer may be modified into the constituent unit B or the constituent unit C.

1. 2. Water

The content of water relative to the total amount of the dispersion liquid is preferably 60 to 95 mol %, more preferably 65 to 95 mol %, and still more preferably 75 to 90 mol %.

1. 3. Coloring Material

The coloring material is not particularly limited, but for example, a disperse dye or a pigment can be used. Among these, the disperse dye is preferred. The use of the disperse dye tends to more improve re-dispersibility after solidification and more improve dry ejection characteristics. These coloring materials may be used alone or in combination of two or more.

Usable examples of the disperse dye include, but are not particularly limited to, known dyes such as C. I. Disperse Yellow, C. I. Disperse Orange, C. I. Disperse Blue, C. I. Disperse Violet, C. I. Disperse Black, and the like.

Examples of an inorganic pigment include, but are not particularly limited to, carbon black (C. I. Pigment Black 7) such as furnace black, lamp black, acetylene black, channel black, and the like, iron oxide, and titanium oxide.

Examples of an organic pigment include, but are not particularly limited to, a quinacridone pigment, a quinacridone-quinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment.

The content of the coloring material relative to the total amount of the dispersion liquid is preferably 7.5% to 30% by mass, more preferably 7.5% to 25% by mass, and still more preferably 8.5% to 20% by mass.

1. 4. pH Adjuster

The dispersion liquid may further contain a pH adjuster. Examples of the pH adjuster include, but are not particularly limited to, inorganic acids (for example, sulfuric acid, hydrochloric acid, nitric acid, and the like), inorganic bases (for example, lithium hydroxide, sodium hydroxide, potassium hydroxide, ammonia, and the like), organic bases (for example, triethanolamine, diethanolamine, monoethanolamine, and tripropanolamine), organic acids (for example, adipic acid, citric acid, succinic acid, and the like), and the like. These pH adjusters may be used alone or in combination of two or more.

2. Ink Composition for Ink Jet Recording

An ink composition for ink jet recording (also simply referred to as an "ink composition") according to the present embodiment contains the dispersion liquid, a surfactant, and a water-soluble organic solvent and may, if required, contain other components. The expression "for ink jet recording" represents use by an ink jet method of ejecting ink droplets from nozzles of an ink jet head.

2. 1. Dispersion Liquid

The dispersion liquid is as described above. The content of the dispersion resin added together with the dispersion liquid to the ink composition, relative to the total amount of the ink composition, is preferably 0.1% to 3.5% by mass, more preferably 0.3% to 3.0% by mass, and still more preferably 0.5% to 2.5% by mass. When the content of the dispersion resin is within the range described above, there is a tendency to more improve re-dispersibility after solidification and more improve ejection stability and dry ejection characteristics.

The content of the coloring material added together with the dispersion liquid to the ink composition, relative to the total amount of the ink composition, is preferably 0.5% to 7.0% by mass, more preferably 1.0% to 6.0% by mass, and still more preferably 1.5% to 4.5% by mass. When the content of the coloring material is within the range described above, there is a tendency to more improve re-dispersibility after solidification and more improve ejection stability and dry ejection characteristics.

The content of the dispersion resin relative to 100 parts by mass of the coloring material in the ink composition is preferably 10 to 100 parts by mass, more preferably 20 to 80 parts by mass, and still more preferably 30 to 60 parts by mass. When the content of the dispersion resin is within the range described above, there is a tendency to more improve re-dispersibility after solidification and more improve ejection stability and dry ejection characteristics.

2. 2. Surfactant

Examples of the surfactant include, but are not particularly limited to, an acetylene glycol-based surfactant, a fluorine-based surfactant, and a silicone-based surfactant.

The acetylene glycol-based surfactant is not particularly limited, but is, for example, preferably one or more selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkylethylene oxide adducts, perfluoroalkylbetaine, and perfluoroalkylamine oxide compounds.

Examples of the silicone-based surfactant include a polysiloxane-based compound, polyether-modified organosiloxane, and the like.

The content of the surfactant relative to the total amount of the ink composition is preferably 0.1% to 3.0% by mass and more preferably 0.1% to 1.0% by mass.

2. 3. Water-Soluble Organic Solvent

Examples of the water-soluble organic solvent include, but are not particularly limited to, glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, and the like; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and the like; nitrogen-containing solvents such as 2-pyrrolidone, N-methyl-2-pyrrolidone, N-ethyl-2-pyrrolidone, and the like; and alcohols such as methanol, ethanol, n-propyl alcohol, iso-propyl alcohol, n-butanol, 2-butanol, tert-butanol, iso-butanol, n-pentanol, 2-pentanol, 3-pentanol, tert-pentanol, and the like. Among these, glycerin, glycols, and glycol monoethers are preferred, and diethylene glycol, propylene glycol, triethylene glycol monomethyl ether, and glycerin are more preferred. The water-soluble organic solvents may be used alone or in combination of two or more.

The content of the water-soluble organic solvent relative to the total amount of the ink composition is preferably 5.0% to 30% by mass and more preferably 10% to 20% by mass. When the content of the water-soluble organic solvent is within the range described above, there is a tendency to more improve re-dispersibility after solidification and more improve ejection stability and dry ejection characteristics.

2. 4. Water

The content of the water relative to the total amount of the ink composition is preferably 60% to 90% by mass and more preferably 70% to 85% by mass. When the content of the water is within the range described above, there is a tendency to more improve re-dispersibility after solidification and more improve ejection stability and dry ejection characteristics.

2. 5. pH Adjuster

The ink composition may further contain a pH adjuster. Examples of the pH adjuster include, but are not particularly limited to, those described for the dispersion liquid. The pH adjuster may be derived from the dispersion liquid and mixed in the ink composition or may be separately added when the ink composition is prepared.

The content of the pH adjuster relative to the total amount of the ink composition is preferably 0.1% to 2.0% by mass and more preferably 0.5% to 1.5% by mass.

2. 6. Other Resin

The ink composition may further contain a resin other than the dispersion resin. Examples of the other resin include, but are not particularly limited to, an anionic resin, a cationic resin, and a nonionic resin. By containing such a resin, the coloring material can be fixed to a recording medium.

Examples of the cationic resin include, but are not particularly limited to, starch derivatives such as cation starch and the like, a cationic urethane resin, a cationic olefin resin, and a cationic allylamine-based resin.

Examples of the anionic resin include cellulose derivatives such as a carboxymethyl cellulose salt, viscose, and the like; and natural resins such as an alginate salt, gum arabic, gum traganth, a ligninsulfonate salt, and the like.

Examples of the nonionic resin include, but are not particularly limited to, an acrylic resin, a styrene-acrylic resin, a urethane-based resin, an ester-based resin, an olefinic resin, and a vinyl acetate-based resin.

The content of the other resin relative to the total amount of the ink composition is preferably 0.1% to 2.0% by mass and more preferably 0.5% to 1.5% by mass.

EXAMPLES

The present disclosure is described in further detail below by using examples and comparative examples. The present disclosure is not limited to the examples below.

1. Synthesis Examples of Dispersion Resin

1. 1. Synthesis Example 1

In a three-neck separable flask with a stirring bar and Dimroth condenser, 50 parts by mass of styrene-maleic anhydride copolymer containing a constituent unit A (Kawahara Petrochemical Co., Ltd., SMA3000P, styrene unit: 75 mol %, maleic anhydride unit: 25 mol %, weight-average molecular weight: 9,500), 60 parts by mass of sodium isethionate (manufactured by Tokyo Chemical Industry Co., Ltd.), and 30 parts by mass of dimethylformamide (manufactured by Tokyo Chemical Industry Co., Ltd.) were added. The inside of the system was heated to 100° C., and reaction was performed for 8 hours. After the completion of reaction, the reaction product was dropped in water to precipitate a white solid. The white solid was recovered by suction filtration, repeatedly washed with water, and then dried under vacuum at 50° C. for 10 hours, producing a copolymer. The resultant copolymer was used as a dispersion resin A.

1. 2. Synthesis Example 2

A copolymer was produced by the same operations as in Synthesis Example 1 except that styrene-maleic anhydride copolymer (Kawahara Petrochemical Co., Ltd., SMA2000P, styrene unit: 66.6 mol %, maleic anhydride unit: 33.3 mol %, weight-average molecular weight: 7,500) was used in place of the styrene-maleic anhydride copolymer (SMA3000P). The resultant copolymer was used as a dispersion resin B.

1. 3. Synthesis Example 3

A copolymer was produced by the same operations as in Synthesis Example 1 except that styrene-maleic anhydride copolymer (Kawahara Petrochemical Co., Ltd., SMA1000P, styrene unit: 50 mol %, maleic anhydride unit: 50 mol %, weight-average molecular weight: 5,500) was used in place of the styrene-maleic anhydride copolymer (SMA3000P). The resultant copolymer was used as a dispersion resin C.

1. 4. Synthesis Example 4

A copolymer was produced by the same operations as in Synthesis Example 3 except that 80 parts by mass of p-phenolsulfonic acid (manufactured by Tokyo Chemical Industry Co., Ltd.) was used in place of 60 parts by mass of sodium isethionate. The resultant copolymer was used as a dispersion resin B.

Table 1 shows the weight-average molecular weight Mw and the composition ratio of constituent units of the copolymer produced in each of the synthesis examples.

1. 5. NMR Analysis

The composition ratio of the constituent units was confirmed by 1H-NMR analysis and 13C-NMR analysis. NMR analysis was performed by using a nuclear magnetic resonance apparatus (JNM-ECX400 manufactured by JEOL. Ltd.).

1. 6. Weight-Average Molecular Weight

The weight-average molecular weight Mw of each of the dispersion resins was measured by chromatography. The conditions are shown below.

Measurement conditions

Apparatus name: HLC8320GPC (Tosoh Corporation)

Guard column: Super AW-L

Column: Super AW3000

Colum temperature: 25° C.

Eluent: dimethylacetamide

Flow rate: 0.6 mL/min

Detector: RI

2. Preparation of Dispersion Liquid (Examples 1 to 4 and Comparative Example 1)

A 1-L eggplant-shaped flask with a stirring bar and Dimroth condenser was set, and 15 parts by mass of each of the copolymers described in Table 1 and 70 parts by mass of pure water were added, heated to 80° C., and then stirred. Then, triethanolamine was added until the pH became 8.0, and pure water was further added up to 100 parts by mass. Then, the resultant mixture was cooled to 25° C., and the resultant aqueous solution was used as a varnish solution.

Next, zirconia beads, 10 parts by mass of the varnish solution, 4 parts by mass of DISPERSE YELLOW 232 (also referred to as "D. Y. 232" hereinafter) used as a water-insoluble coloring material, and 17 parts by mass of pure water were added and ground for 1 hour by a beads mill. Then, the zirconia beads were removed, and pure water was added up to 100 parts by mass, preparing a dispersion liquid containing 1.5 parts by mass of the copolymer and 4 parts by mass of the coloring material.

3. Preparation of Ink Composition

The dispersion liquid was mixed with other components so as to obtain the composition shown in Table 2, preparing each of the ink compositions.

TABLE 1

| | Constituent unit A | | Constituent unit B | | | Constituent unit C | |
|---|---|---|---|---|---|---|---|
| | Type | mol % | $R^1$ | $R^2$ | mol % | mol % | Mw |
| Synthesis Example 1 | Styrene | 75 | Ethylene group | Sulfonate group | 23.8 | 1.2 | 11700 |
| Synthesis Example 2 | Styrene | 66 | Ethylene group | Sulfonate group | 32.3 | 1.7 | 9800 |
| Synthesis Example 3 | Styrene | 50 | Ethylene group | Sulfonate group | 47.5 | 2.5 | 8000 |
| Synthesis Example 4 | Styrene | 50 | Phenylene group | Sulfonate group | 47.5 | 2.5 | 9200 |

4. Evaluation

4. 1. Re-Dispersibility

Five μL of the ink composition prepared as described above was dropped on a slide glass and then solidified by drying for 16 hours in a dryer of 40° C. Then, the slide glass was dipped in a sample bottle containing ink water, and the re-dispersion behavior of a solid was confirmed by visual observation. This operation was performed with attention so that the ink water was neither stirred nor the like. The ink water represents not containing the coloring material and the dispersion resin shown in Table 2. The evaluation criteria of re-dispersibility are shown below.

Evaluation Criteria
- A: The solid disappeared, and re-dispersion was observed.
- B: The solid partially remained, but re-dispersion was observed.
- C: The solid remained, and re-dispersion was not observed.

4. 2. Ejection Stability

An ink jet-system printer EM-930C (trade name, manufactured by Seiko Epson Corporation) was filled with an ink composition for ink jet recording, and printing was continuously performed for 2 hours. A nozzle check pattern of nozzles used for printing was printed before and after printing to confirm the nozzles causing a deteriorating deviation of landing positions. In this case, the number of the nozzles was 180. The evaluation criteria are as follows. The evaluation result "A" or "B" can be determined as "good".

Evaluation Criteria
- A: The number of nozzles with a deteriorating deviation of the landing positions was 1% or less.
- B: The number of nozzles with a deteriorating deviation of the landing positions was over 1% and 5% or less.
- C: The number of nozzles with a deteriorating deviation of the landing positions was over 5%.

4. 3. Dry Ejection Characteristics

An ink jet-system printer EM-930C (trade name, manufactured by Seiko Epson Corporation) was filled with an ink composition for ink jet recording, and an ejection head was removed from a suctioning cap and allowed to stand for 1 day. After allowing to stand, cleaning was performed once, and continuous printing was performed on 20 pages under ejection from all nozzles to determine the number of nozzles causing printing omission/bending based on the following criteria. The evaluation result "A" or "B" can be determined as "good".

Evaluation Criteria
- A: No nozzles causing omission/bending
- B: 1 to 5 nozzles causing omission/bending
- C: 6 or more nozzles causing omission/bending

TABLE 2

|  |  | Example | | | | Comparative Example |
|---|---|---|---|---|---|---|
|  |  | 1 | 2 | 3 | 4 | 1 |
| Coloring material | | 2.0 | 2.0 | 2.0 | 2.0 | 2.0 |
| Dispersant | Dispersion resin A | 0.75 | | | | |
|  | Dispersion resin B | | 0.75 | | | |
|  | Dispersion resin C | | | 0.75 | | |
|  | Dispersion resin D | | | | 0.75 | |
|  | SMA2000 | | | | | 0.75 |
| pH adjuster | Triethanolamine | 0.5 | 0.5 | 0.5 | 0.5 | 0.5 |
| Surfactant | BYK348 | 0.5 | 0.5 | 0.5 | 0.1 | 0.1 |
|  | Olfine E1010 | 0.5 | 0.5 | 0.5 | 0.5 | 0.5 |
| Water-soluble organic solvent | Propylene glycol | 5.0 | 5.0 | 5.0 | 5.0 | 5.0 |
|  | Triethylene glycol monobutyl ether | 5.0 | 5.0 | 5.0 | 5.0 | 5.0 |
|  | Glycerin | 7.0 | 7.0 | 7.0 | 7.0 | 7.0 |
|  | Diethylene glycol | 5.0 | 5.0 | 5.0 | 5.0 | 5.0 |
|  | Water | Balance | Balance | Balance | Balance | Balance |
| | Total | 100 | 100 | 100 | 100 | 100 |
| Evaluation | Re-dispersibility | A | A | B | A | C |
|  | Ejection stability | A | A | A | B | C |
|  | Dry rejection property | A | B | A | B | C |

BYK-348: Silicone-based surfactant manufactured by BYK Chemie Co., Ltd.

Olfine E1010: Acetylene glycol-based surfactant, manufactured by Nisshin Chemical Industry Co., Ltd.

As described above, it is found that the ink compositions of the examples using the dispersion liquid of the present disclosure have excellent re-dispersibility, more improved dry ejection characteristics, and excellent ejection stability as compared with the comparative example.

What is claimed is:

1. A dispersion liquid comprising:
   water;
   a coloring material, wherein the coloring material is a disperse dye; and
   a dispersion resin that disperses the coloring material,
   wherein the dispersion resin has a constituent unit A containing a hydrophobic monomer and a constituent unit B represented by any one of the following formulae (1-1) and (1-2),

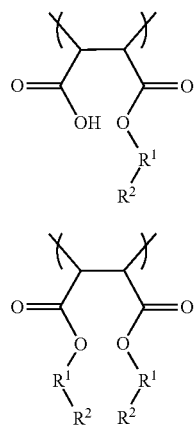 (1-1)

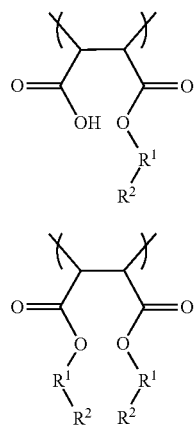 (1-2)

in the formulae, $R^1$ independently represents a divalent organic group having 1 to 20 carbon atoms, and $R^2$ independently represents a sulfonic acid group or a salt thereof.

2. The dispersion liquid according to claim 1, wherein the constituent unit A contains, as the hydrophobic monomer, one or more selected from the group consisting of styrene, α-methylstyrene, allylbenzene, vinyltoluene, 1-vinylnaphthalene, and 2-vinylnaphthalene.

3. The dispersion liquid according to claim 1, wherein the constituent unit B is represented by formula (1-1).

4. The dispersion liquid according to claim 1, wherein the divalent organic group represented by $R^1$ contains one or more selected from the group consisting of a divalent aliphatic hydrocarbon group and a divalent aromatic hydrocarbon group.

5. The dispersion liquid according to claim 1, wherein the content of the constituent unit A is 40 to 85 mol % relative to the total amount of the dispersion resin.

6. The dispersion liquid according to claim 1, wherein the content of the constituent unit B is 15 to 60 mol % relative to the total amount of the dispersion resin.

7. The dispersion liquid according to claim 1, wherein the dispersion resin further has a constituent unit C represented by the following formula (2-1)

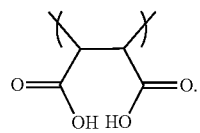 (2)

8. The dispersion liquid according to claim 7, wherein the content of the constituent unit C is 0.5 to 15 mol % relative to the total amount of the dispersion resin.

9. The dispersion liquid according to claim 1, wherein the weight-average molecular weight of the dispersion resin is 5,000 to 30,000.

10. An ink composition for ink jet recording comprising:
the dispersion liquid according to claim 1;
a surfactant; and
a water-soluble organic solvent.

* * * * *